May 25, 1965  B. J. SWEO ETAL  3,185,554

METHOD FOR RAW MATERIAL PRE-HEATING FOR GLASS MELTING

Filed July 19, 1960  2 Sheets-Sheet 1

INVENTORS
BENJAMIN J. SWEO
& JAMES H. GINTHER
BY
Meyer, Baldwin, Doran & Young
ATTORNEYS May 25, 1965 B. J. SWEO ETAL 3,185,554
METHOD FOR RAW MATERIAL PRE-HEATING FOR GLASS MELTING
Filed July 19, 1960 2 Sheets-Sheet 2

INVENTORS
BENJAMIN J. SWEO
& JAMES H. GINTHER
BY
Meyer, Baldwin, Doran & Young
ATTORNEYS

3,185,554
METHOD FOR RAW MATERIAL PRE-HEATING FOR GLASS MELTING

Benjamin J. Sweo, Lakewood, and James H. Ginther, Berea, Ohio, assignors to Ferro Corporation, Cleveland, Ohio, a corporation of Ohio
Filed July 19, 1960, Ser. No. 43,762
9 Claims. (Cl. 65—17)

This invention deals generally with the fusion of raw glass batch materials into a molten glass, and more particularly with a preliminary heat treatment of said raw materials prior to their entry into a melting furnace.

Previously, in the melting of glass for various purposes such as structural units, containers, fibers, vitreous enamel, etc., the raw batch materials have been introduced into the melting furnace, where the operation is a continuous one, without any effort to controllably pre-heat said raw materials prior to entry into the melting furnace. While it is true that raw materials being continuously fed into a melting furnace using conventional processes are pre-heated to a limited extent due to a certain amount of residual heat carried by convection, conduction and radiation from the melting furnace to the feed mechanism, such residual heat transfer has never been sufficient to raise the ambient temperature of the raw glass batch itself to temperatures in excess of 150 or 200 degrees Fahrenheit prior to its entry into the melting furnace.

Heretofore, it had not appeared to be feasible to pre-heat powdered raw material prior to entry into a glass melting furnace inasmuch as it seemed the heat required to pre-heat the raw material, as well as heat the means for conveying such raw material to the melting furnace, plus the heat required for maintaining the temperature of the melting furnace itself, would be far in excess of the total heat required to process the same quantity of raw batch into glass entirely within the melting furnace, and without a pre-heating assembly. This, plus the fact that pre-heating means would add to equipment costs, strongly tended to militate against experimentation in the controlled pre-heating of raw materials prior to entry into a glass melting furnace.

Contrary to every expectation however, we have surprisingly found that the utilization of a pre-heating unit, having its own separate and independently controllable heat source, for raw batch materials for the manufacture of glass, in a continuous operation, not only reduces the total manufacturing costs per unit weight of glass produced, but also greatly improves the efficiency of a glass furnace by virtue of the rate of glass produced being substantially increased, in conjunction with reduced costs per unit weight of glass produced, over the rate of glass produced by the melting furnace when used without our novel pre-heating means.

Briefly stated, our novel concept involves passing powdered, raw, glass batch material continuously through a pre heating chamber having its own controllable heat source and an ambient temperature in the range of 150 to 1200 degrees Fahrenheit whereby said raw material is elevated in temperature to a point equal to, or just slightly ber, but below the fusion point of the raw batch, thereby driving from said raw batch mechanically and chemically combined volatiles such as water vapor, nitrates; venting said volatiles anteriorly the melting zone, and introducing the pre-heated raw glass batch material into the melting zone of a glass melting furnace on a continuous basis. Subsequent glass melting operations then follow a conventional pattern altered only by the desirable end result of our invention, namely, total lower heat in-put per unit weight of glass produced, and greater efficiency. The temperature of our pre-heat atmosphere must be independently controllable from the glass melting means.

Although one variation of our invention teaches venting of volatiles driven off by pre-heating anteriorly the glass melting furnace, we have found that similar results may be achieved by permitting venting of the volatiles driven off by pre-heating directly into the melting furnace, but spaced ahead and away from the melting zone, where they are quickly carried away by the rapidly moving current of the stack exhaust.

Although the prior art shows that various attempts have been made to pre-heat glass batches, none have taught the refined method of our invention for achieving our new and improved results, namely, utilization of a heat source independently controllable and separate from the melting heat source, for pre-heating glass batches to a definite pre-determined temperature below the sintering point of the batch, just prior to melting.

In U.S. Patent No. 823,737, Betz utilized waste heat to partially dry wet batch materials, stored above the glass tank awaiting their introduction into glass tank, on a periodic basis. Such method could not possibly be utilized to achieve our novel result since the demands of modern glass technology are such that every phase of a continuous operation must be maintained at an invariable level to produce glass of consistently uniform quality. It is for this reason that we must have an independently controllable heat source for our novel pre-heater. That is, unless, for a given glass, the raw batch is introduced continuously, at a constant pre-heated temperature as selected for said given glass, into a melting furnace, the finished glass will suffer accordingly in some physical characteristic, such as acid resistance, thermal expansion, etc. Obviously, Betz' system was such that apparently any temperature he was able to realize from waste heat was relied upon to drive off whatever moisture possible in his raw batch, which was introduced into the glass melting furnace periodically, and at unknown and variable temperatures.

We have found that waste heat would be both inadequate and too unpredictable to be relied upon completely to supply the heat for our method of pre-heating, which requires a separate and independently controllable heat source for our batch material pre-heater, from the main heat source for melting the batch. Betz' method would not suffice to uniformly drive off chemical as well as mechanical water, as does our method, nor could his method be expected to drive off, uniformly, such volatiles as nitrates, as does our method.

United States Patent No. 2,114,545 to Slayter teaches the method of partially fusing a batch composed of glass cullet and raw glass-forming materials prior to introduction into a glass melting furnace. We however cannot tolerate even the slightest incipient fusion of any of the batch materials during preheating. As the materials are preheated during their passage through a relatively enclosed space and even the slightest fusion or sintering would be detrimental to the continual feeding of the raw batch. Our method requires preheating of raw materials in a relatively confined area of ambient temperature with no localized "hot spots" in the batch in order to provide close control over the critical temperature range of the preheated batch to deviate the possibility of fusion during preheating, whereas Slayter's method involves no critical temperature, any degree of pre-fusion or sintering being tolerable so long as fusion does not proceed so far in preheating as to permit the cullet-batch combination to lose its identity as discrete particles and flow through and off, the preheating conveyor. We have furthermore found that any degree of fusion or sintering in our preheating operation tends to entrap within the sintered particles the very volatiles such as water vapor, nitrates, etc., we seek to drive off prior to the actual melting zone of the glass furnace.

And, where an electrically heated glass melting furnace (in which, as is well known in the art, raw materials for porcelain enamel frit, the preferred glass compositions herein are smelted at temperatures generally about 1800° F. to 2600° F. and preferably about 2000° F. to 2400° F.) is used in conjunction with our invention, the somewhat fluffy texture of the raw glass batch as it enters the melting zone is relied upon as insulation somewhat to prevent undue upward heat loss from the furnace melting zone. The use of relatively large, discrete sintered particles, as taught by Slayter, would tend to permit an intolerable amount of heat loss between the open spaces between the sintered particles within the batch as it enters the melting furnace.

While our preferred embodiments involve complex vitreous enameling glasses, it is well known by those skilled in the art of glass manufacture that basic manufacturing principles are equally applicable to all types of glasses with but immaterial limitations. And, while we have used electrical elements in or pre-heat chamber and prefer this type of preheating means, it is to be understood that any suitable heating means, such as oil, gas or coal may be used.

Mainly we concentrated on electrical pre-heating and melting means to permit us to more accurately measure and compare power in-put for the purpose of evaluating comparative manufacturing costs and efficiency, but in accordance with the United States patent statutes and interpretive court decisions, it is to be understood that the essence of this invention does not reside solely in the use of electrical pre-heating and melting means, but rather in the broad concept of pre-heating raw material within critical temperature limits, followed by melting the same into glass by any suitable means such as gas, oil or coal.

It, therefore, is a principal object of our invention to provide a process for pre-heating raw glass batch materials prior to melting in order to realize a lowered cost of manufacture per unit weight of glass produced than has heretofore been possible.

It is a further object of this invention to provide a process for improving the efficiency of a glass melting operation.

Also, we have as an object of our invention a suitable method for removing volatiles such as mechanical and chemical water, nitrates, etc., from a raw glass batch prior to melting said raw glass batch into a glass.

Also it is another object of this invention to provide a method for substantially improving the efficiency of a glass melting furnace.

It is also an object of this invention to manufacture a glass by a more efficient method than previously possible.

It is an object of the present invention to provide means for controllably preheating a raw glass batch prior to its introduction into a continuous melting furnace.

It is an object of the present invention to provide means including pre-heating for controllably heating a raw porcelain enamel batch prior to its introduction into a porcelain enamel melting furnace and to provide venting means for exhausting volatiles from said raw batch away from the melting zone of the furnace.

Following then by way of illustration, but to be considered in no way a limitation on the innumerable variations which may be achieved based on our invention without departing from its basic teachings, are several preferred glass compositions in Table I utilizing the methods and apparatus shown in the attached drawings wherein.

The preferred glass compositions used in furnaces such as shown in the figures above described are:

TABLE I.—GLASS COMPOSITION

[Melted weight basis, parts by weight]

| | A | B | C | D | E |
|---|---|---|---|---|---|
| $SiO_2$ | 39.2 | 52.8 | 48.7 | 36.8 | 41.3 |
| $B_2O_3$ | 19.4 | 16.4 | 16.0 | 18.2 | 18.2 |
| $Al_2O_3$ | 5.4 | 6.7 | 6.7 | 3.5 | 5.4 |
| $Na_2O$ | 16.3 | 13.8 | 14.4 | 17.4 | 15.9 |
| $K_2O$ | 3.0 | 3.7 | 3.6 | 1.9 | 3.5 |
| CaO | 9.4 | 2.1 | 6.6 | 9.9 | 8.3 |
| $F_2$ | 0.8 | 0.5 | 1.1 | 2.8 | 0.9 |
| CoO | 0.6 | 0.8 | 0.5 | 0.7 | 0.8 |
| NiO | 1.2 | 1.1 | 0.7 | 1.3 | 1.2 |
| MnO | | 1.5 | 1.7 | 1.7 | 0.8 |
| BaO | | | | 4.5 | 2.2 |
| $P_2O_5$ | | 0.6 | | 1.0 | 0.5 |
| CuO | 0.6 | | | 0.3 | 0.4 |
| $Li_2O$ | | | | | 0.6 |
| $ZrO_2$ | | | | | |
| Percent glass yield (based on raw batch) | 94.0 | 95.0 | 95.8 | 92.9 | 93.3 |
| Preheat chamber temp., °F. | 790 | 775 | 810 | 800 | 800 |
| Raw batch input lbs/hr | 1,270 | 1,165 | 1,183 | 1,250 | 1,240 |

Figure 1:
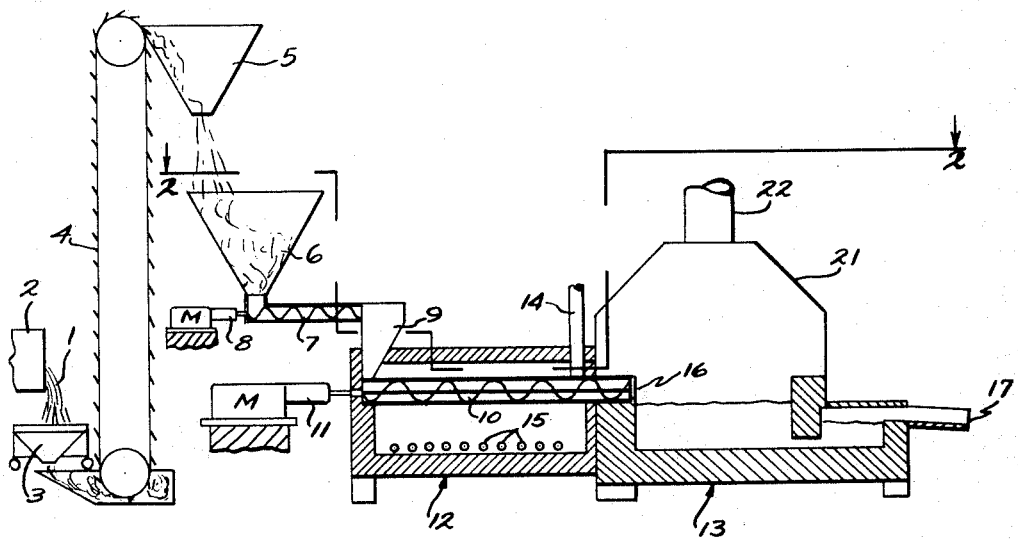
FIG. 1 is an elevational view of an electrically powered glass melting furnace in combination with a pre-heating chamber, vented to the atmosphere with parts broken away and shown in section.
Figure 2:
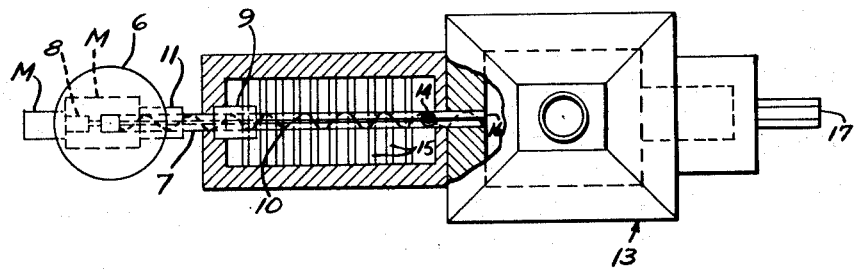
FIG. 2 is a plan view of the apparatus in FIG. 1 taken along the line 2—2 indicated in FIG. 1 and showing parts of the pre-heating chamber in section.

Vitreous enamel ground coat glasses A through E shown in Table I were processed through the equipment shown in FIGS. 1 and 2, the process including the steps of thoroughly mixing the raw glass batch materials 1 in a Worthington, horizontal, cylindrical periodic mixer 2 from whence the thoroughly mixed batch was discharged into portable batch cars 3, which were moved into position to discharge their batch to be vertically transported by bucket elevator 4 to storage hopper 5 from which the mix flowed by gravity to surge hopper 6.

The quantity control screw feeder 7, powered by suitable motor and speed reducer 8 was fed by gravity from the surge hopper 6 and pushed the batch toward the furnace at the respective rate for each batch shown in Table I, to the pre-heat chamber feed hopper 9, from which the pre-heat chamber screw feeder 10, powered by suitable motor and speed reducer 11, was fed by gravity, said pre-heat chamber screw feeder progressively working the raw batch through pre-heat chamber 12 toward the electrically heated furnace 13, while in said pre-heat chamber 12 the raw batch was elevated in temperature as shown in Table II for each glass.

TABLE II

| Glass | Total power consumed, kw/lb. of glass | | Production rate, lb. glass/hr. | |
|---|---|---|---|---|
| | With preheater | Without preheater | With preheater | Without preheater |
| A | .400 | .604 | 1,200 | 820 |
| B | .505 | .530 | 1,100 | 800 |
| C | .390 | .644 | 1,125 | 675 |
| D | .555 | .568 | 1,050 | 775 |
| E | .451 | .520 | 1,150 | 810 |
| Average | .460 | .573 | 1,125 | 776 |

$$\text{Percent power reduction (average)} = \frac{(.573-.460)(100)}{0.573} = 19.75\%$$

$$\text{Percent average production increase} = \frac{(1125-776)(100)}{776} = 45\%$$

The pre-heat chamber screw feeder 10 is so designed that the raw materials, as they move through it, almost, but not completely, fill the housing of said pre-heat chamber screw feeder, thus permitting free circulation of whatever volatiles, such as water vapor, nitrates, etc., are liberated due to the pre-heating treatment, which free circulation induces a venting of said volatiles upwardly through vent 14, to the outer atmosphere, prior to the passage of the raw glass batch into the melting furnace 13.

The pre-heat chamber 12 comprises a completely enclosed, box-like structure of common refractory brick, of conventional construction, the vent 14 communicating directly with the housing of pre-heat chamber screw feeder 10.

Heat for the pre-heat chamber 12 was supplied by 12 silicon carbide resistance elements 15 of the Carborundum AT Type ("Blo-Bar") of the dimensions 96" length x 72" effective heating length x 2⅛" diameter, 1.125 ohm nominal resistance. Said elements were positioned along the bottom of said pre-heat chamber as shown, disposed transversely to the direction of movement of the raw batch. The pre-heat chamber power setting applied to glass C is shown in Table III, as an example of the power required to maintain a given pre-heat temperature, at a given rate of feed.

TABLE III.—RAW GLASS

*Batch composition, parts by weight*

Glass C: Parts
- Borax (dehydrated) _____ 23.0
- Quartz _____ 17.2
- Feldspar _____ 35.4
- Soda ash _____ 10.2
- Fluorspar _____ 1.5
- Cobalt oxide _____ 0.5
- Manganese oxide _____ 1.6
- Nickel oxide _____ 0.7
- Wollastonite _____ 9.9
- Yield _____ 95.8

|  | Without preheater | With preheater |
|---|---|---|
| Raw batch feed, lb./hr | 750 | 1,250 |
| Power input, kw: |  |  |
| Preheater | 0 | 70–75 |
| Melting zone | 420–460 | 360–400 |
| Total | 420–460 | 430–475 |
| Glass produced, average lb./hr | 675 | 1,125 |
| Kw./lb. of glass produced (ave.) | 0.64 | 0.39 |
| Temperature of preheater, ambient, °F | 1,000–1,050 | |
| Temperature of exit raw material from preheater into melting zone, °F | 800–900 | |

From the pre-heat chamber screw feeder 10, the preheated raw batch was discharged into a conventional electric furnace 13, at point 15, melted into a glass at the respective melting furnace temperatures indicated in Table I and discharged continuously as molten glass at point 17 at the rates indicated by percent yield based on raw batch input in Table I, respectively for each glass.

From Table II, it will readily be seen that using our unique process, we have realized a substantial reduction in total power required to produce glass, as well as an appreciable increase in efficiency, based on glass production rate per unit of power consumed. Table II illustrates differences derived from studies with and without preheating.

Figure 3:
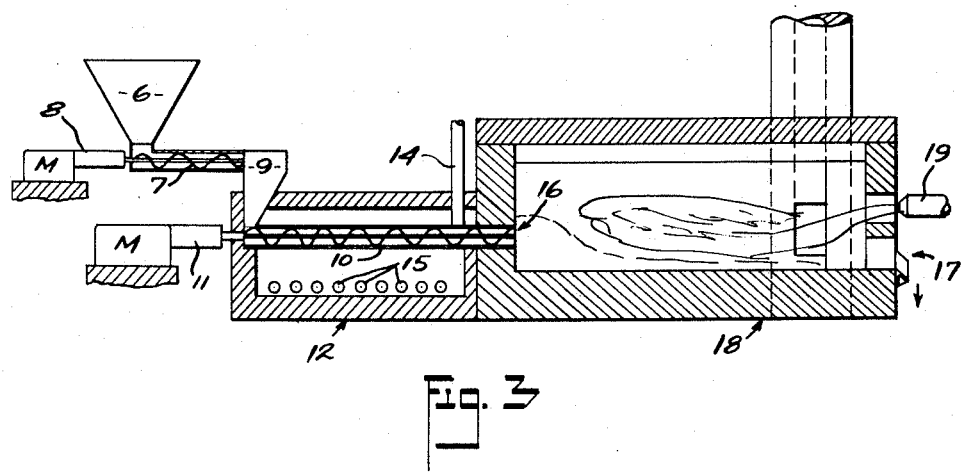
FIG. 3 is an elevational view of a fuel-fired glass melting furnace in combination with our novel pre-heating chamber.

FIG. 3 shows another variation of our apparatus that may be used to more economically and efficiently produce glass, wherein the mixing and preheating apparatus remain the same but the electric glass melting furnace 13 has been replaced with a fluid combustion type furnace 18 heated by means of suitable burner 19.

Figure 4:
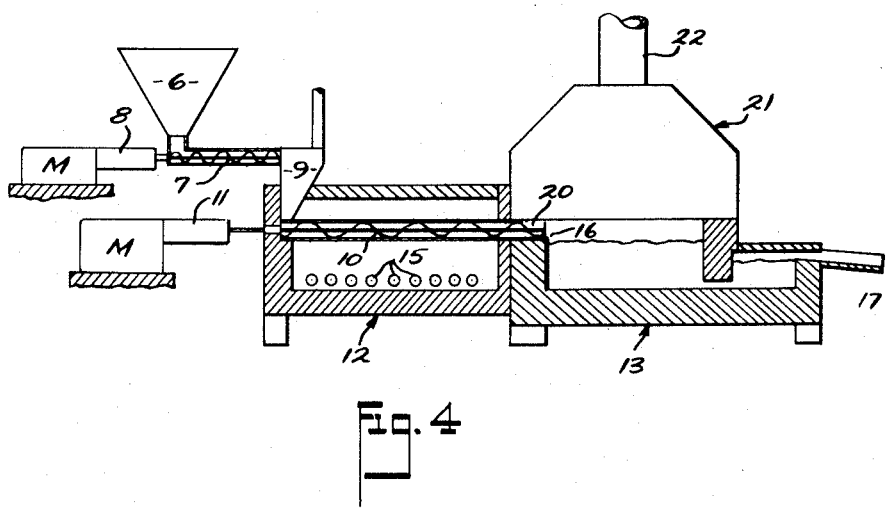
FIG. 4 is an elevational view of an electrically heated glass melting furnace in combination with our novel pre-heating chamber, vented into the exhaust hood of said melting furnace, but anteriorly the melting zone.

FIG. 4 illustrates another variation of the method, the apparatus remaining the same as that shown in FIGS. 1 and 2 with the exception that the vent 14 has been omitted. In this variation, the volatiles escape at point 20 and are vented through hood 21 and stack 22 of the furnace 12, anteriorly the melting zone. Table III illustrates generally the type raw batch formula used to achieve the melted compositions shown in Table I, and further illustrates on a comparative basis the advantages of controlled raw glass batch preheating. While our preferred range of preheat temperatures is encompassed between about 600 to 1200° F. and the best results are obtained at about 700° F. to 1100° F., as illustrated in Tables I through III, we have also found that preheating even as low as 150° F. affords improvement in efficiency and economy, as illustrated in Table IV.

TABLE IV.—GLASS C

[See Table III for composition]

| Raw material preheat temperature | Room temp. | 150° F | 300° F. | 500° F. | 800° F. |
|---|---|---|---|---|---|
| Kw./lb. of glass produced (ave.) | .64 | .48 | .45 | .415 | .40 |
| Glass produced, ave./lb. hr | 675 | 950 | 1,020 | 1,090 | 1,125 |

It is to be understood that, in accordance with the provisions of the patent statutes, the particular form of apparatus shown and described and the particular procedure set forth are presented for purposes of explanation and illustration and that various modifications of said apparatus and said procedure can be made without departing from our invention.

What is claimed is:

1. In a method of continuously smelting a raw batch of porcelain enamel-forming materials at a temperature of about 1800° to 2600° F. in a porcelain enamel frit smelter having a charging zone, a melting zone and a discharging zone all communicating with each other and integrally connected together, and continuously discharging the melted batch, the improvement therein of preheating the raw batch in a pre-heating chamber integrally connected to the charging zone before introducing the batch into the charging zone, and controlling the temperature of the pre-heated raw batch from about 600° F. to 1200° F. for a time sufficient to drive off the volatiles.

2. A method of continuously melting a raw glass batch and discharging molten glass from a furnace, the method comprising the steps of continuously preheating a raw glass batch using heating means separate from the heating means for said furnace, controlling the temperature of said preheating step between about 600° F. and 1200° F. for a sufficient time to drive off the volatiles, continuously feeding the preheated batch into the furnace, continuously melting the batch into a molten glass, and continuously discharging the molten glass from the furnace.

3. A method of continuously melting a raw glass from a furnace, the method comprising the steps of continuously preheating a raw glass batch using heating means separate from the heating means for said furnace, controlling the temperature of said preheating step between about 700° F. to 1100° F. for a sufficient time to drive off the volatiles, continuously feeding the preheated batch into the furnace, continuously melting the batch into a molten glass, and continuously discharging the molten glass from the furnace.

4. The method of claim 2 wherein the steps of pre-heating and melting are carried out electrically.

5. The method of claim 2 wherein the raw glass batch is pre-heated electrically and melted by fluid combustion.

6. The method of claim 2 wherein the raw glass batch is pre-heated by fluid combustion and melted electrically.

7. The method of claim 2 wherein the raw glass batch is pre-heated and melted by fluid combustion.

8. Glass produced by the process defined in claim 2.

9. Porcelain enamel frit produced by the process defined in claim 1.

References Cited by the Examiner

UNITED STATES PATENTS

| | | | |
|---|---|---|---|
| 823,757 | 6/06 | Betz | 263—41 |
| 826,139 | 7/06 | Brookfield | 214—18 X |
| 1,543,770 | 6/25 | Hilbert | 65—18 |
| 2,114,545 | 4/38 | Slayter | 65—21 |
| 2,284,398 | 5/42 | Kutchka | 65—335 X |

DONALL H. SYLVESTER, *Primary Examiner.*

CHARLES R. HODGES, *Examiner.*

UNITED STATES PATENT OFFICE
CERTIFICATE OF CORRECTION

Patent No. 3,185,554  
May 25, 1965

Benjamin J. Sweo et al.

It is hereby certified that error appears in the above numbered patent requiring correction and that the said Letters Patent should read as corrected below.

Column 1, line 62, strike out "ber," and insert instead -- below, the ambient temperature of said pre-heating chamber, --.

Signed and sealed this 8th day of February 1966.

(SEAL)  
Attest:

ERNEST W. SWIDER  
Attesting Officer

EDWARD J. BRENNER  
Commissioner of Patents